US012501401B2

(12) United States Patent
Kim

(10) Patent No.: US 12,501,401 B2
(45) Date of Patent: Dec. 16, 2025

(54) METHOD AND APPARATUS FOR MONITORING PAGING IN WIRELESS MOBILE COMMUNICATION SYSTEM

(71) Applicants: BLACKPIN Inc., Seoul (KR); Soenghun Kim, Hanam-si (KR)

(72) Inventor: Soenghun Kim, Hanam-si (KR)

(73) Assignees: Blackpin Inc., Seoul (KR); Soenghum Kim, Gyeonggi-do (KR)

( * ) Notice: Subject to any disclaimer, the term of this patent is extended or adjusted under 35 U.S.C. 154(b) by 0 days.

(21) Appl. No.: 18/412,639

(22) Filed: Jan. 15, 2024

(65) Prior Publication Data
US 2024/0172177 A1 May 23, 2024

Related U.S. Application Data

(63) Continuation of application No. PCT/KR2022/018732, filed on Nov. 24, 2022.

(30) Foreign Application Priority Data

Nov. 26, 2021 (KR) .................. 10-2021-0165132

(51) Int. Cl.
H04W 72/10 (2009.01)
H04W 48/08 (2009.01)
H04W 68/00 (2009.01)
H04W 72/04 (2023.01)
H04W 76/27 (2018.01)
H04W 76/28 (2018.01)

(52) U.S. Cl.
CPC ......... *H04W 68/005* (2013.01); *H04W 48/08* (2013.01); *H04W 76/27* (2018.02); *H04W 76/28* (2018.02)

(58) Field of Classification Search
None
See application file for complete search history.

(56) References Cited

FOREIGN PATENT DOCUMENTS

| KR | 1020170125296 A | 11/2017 | |
|----|-----------------|---------|---|
| KR | 1020190132429 A | 11/2019 | |
| KR | 1020200105512 A | 9/2020 | |
| WO | WO-2021075850 A1 * | 4/2021 | ............ H04W 48/18 |

OTHER PUBLICATIONS

International Search Report for International Patent Application No. PCT/KR2022/018732, dated Feb. 24, 2023.
Ericsson, "Running CR for the RedCap WI," 3GPP TSG-RAN2 Meeting #116-e, Online, R2-2111095, Nov. 1-12, 2021.
Ericsson, "Running CR for the RedCap WI," 3GPP TSG-RAN2 Meeting #116-e, Online, R2-2111097, Nov. 1-12, 2021.
Radisys et al., "Redcap UE Support over F1," 3GPP TSG-RAN2 WG3 #114-e, R3-215916, Nov. 1-11, 2021.

(Continued)

Primary Examiner — Gary Lafontant
(74) Attorney, Agent, or Firm — Fish & Richardson P.C.

(57) ABSTRACT

A method and apparatus for paging is provided. Method of terminal for paging includes receiving SystemInformationBlock1, determining the paging frame based at least in part on the first T. determining the index of paging occasion based at least in part on the second T and monitoring paging occasion per DRX cycle.

13 Claims, 9 Drawing Sheets

(56) References Cited

OTHER PUBLICATIONS

MediaTek Inc., "Paging Improvement in NR-U," 3GPP TSG-RAN WG2 Meeting #106, Tdoc R2-19 05699, May 13-17, 2019, 6 pages.
Nokia et al., "Paging eDRX information delivery for RRC_INACTIVE UE in XnAP," 3GPP TSG-RAN WG3#112-e, E-meeting, R3-212811, May 17-27, 2021, 7 pages.
Notice of Allowance in Korean Appln. No. 10-2021-0165132, mailed on Sep. 22, 2023, 5 pages (with English translation).
Notice of Allowance in Korean Appln. No. 10-2021-0175105, mailed on Sep. 10, 2024, 5 pages (with English translation).
Office Action in Korean Appln. No. 10-2021-0165132, mailed on Feb. 15, 2023, 14 pages (with English translation).
Office Action in Korean Appln. No. 10-2021-0165132, mailed on Jun. 23, 2023, 8 pages (with English translation).
Office Action in Korean Appln. No. 10-2021-0175105, mailed on Jan. 18, 2024, 9 pages (with English translation).
Qualcomm Incorporated, "Subgrouping for paging occasions," 3GPP TSG-RAN WG2 Meeting #116-e, Online, R2-2109455, Nov. 1-12, 2021, 3 pages.
3GPP TS 38.331 V16.6.0 (Sep. 2021); Technical Specification; 3rd Generation Partnership Project; Technical Specification Group Radio Access Network;NR;Radio Resource Control (RRC) protocol specification(Release 16).
3GPP TS 38.413 V16.7.0 (Oct. 2021); Technical Specification; 3rd Generation Partnership Project; Technical Specification Group Radio Access Network; NR-RAN; NG Application Protocol (NGAP) (Release 16).
3GPP TS 38.423 V16.7.0 (Oct. 2021); Technical Specification; 3rd Generation Partnership Project; Technical Specification Group Radio Access Network; NR-RAN; Xn application protocol (XnAP) (Release 16).
3GPP TS 38.473 V16.7.0 (Oct. 2021); Technical Specification; 3rd Generation Partnership Project; Technical Specification Group Radio Access Network;NR-RAN; F1 application protocol (F1AP) (Release 16).

* cited by examiner

User Plane Protocol Stack

Control Plane Protocol Stack

METHOD AND APPARATUS FOR MONITORING PAGING IN WIRELESS MOBILE COMMUNICATION SYSTEM

CROSS-REFERENCE TO RELATED APPLICATION

This application is a continuation of International Application No. PCT/KR2022/018732, filed on Nov. 24, 2022, which claims priority to and the benefit of Korean Patent Application No. 10-2021-0165132, filed on Nov. 26, 2021, the disclosure of which is incorporated herein by reference in its entirety.

BACKGROUND

Technical Field

The present disclosure relates to paging in wireless mobile communication system.

Related Art

To meet the increasing demand for wireless data traffic since the commercialization of 4th generation (4G) communication systems, the 5th generation (5G) system is being developed. For the sake of high data rate, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency. Since high frequency band is utilized for 5G radio, uplink coverage problem can occur. To mitigate the uplink coverage problem, enhancements are required.

SUMMARY

Aspects of the present disclosure are to address the problems of paging. The present disclosure is to provide a method and an apparatus for paging. In accordance with an aspect of the present disclosure, a method of a terminal in mobile communication system comprises receiving SystemInformationBlock1, determining the paging frame based at least in part on the first T. determining the index of paging occasion based at least in part on the second T and monitoring paging occasion per DRX cycle.

DETAILED DESCRIPTION

Figure 1A:
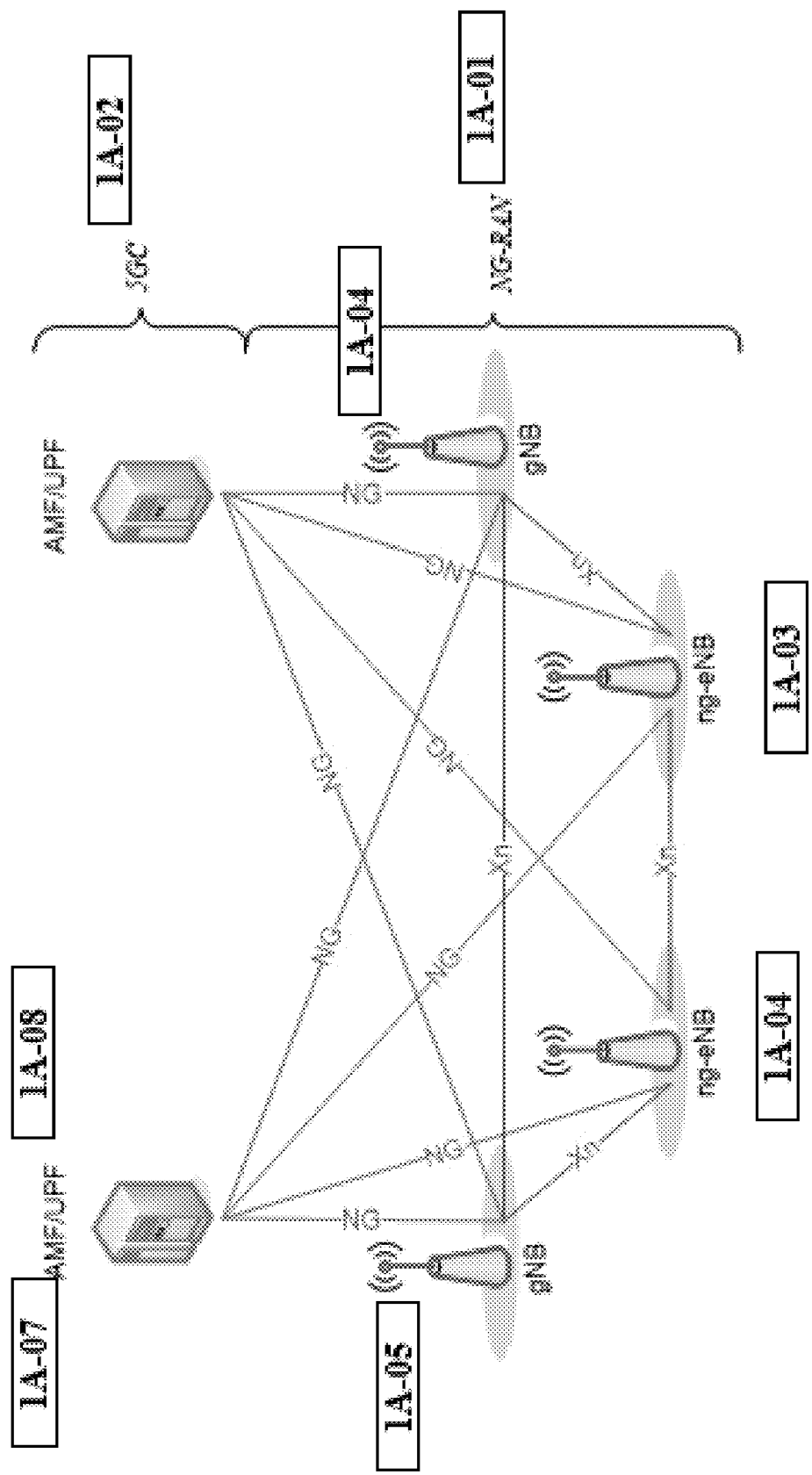
FIG. 1A is a diagram illustrating the architecture of an 5G system and a NG-RAN.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name |
| --- | --- |
| 5GC | 5G Core Network |
| ACK | Acknowledgement |
| AM | Acknowledged Mode |
| AMF | Access and Mobility Management Function |
| ARQ | Automatic Repeat Request |
| AS | Access Stratum |
| ASN.1 | Abstract Syntax Notation One |
| BSR | Buffer Status Report |
| BWP | Bandwidth Part |
| CA | Carrier Aggregation |
| CAG | Closed Access Group |
| CG | Cell Group |
| C-RNTI | Cell RNTI |
| CSI | Channel State Information |
| DCI | Downlink Control Information |
| DRB | (user) Data Radio Bearer |
| DRX | Discontinuous Reception |
| HARQ | Hybrid Automatic Repeat Request |
| IE | Information element |
| LCG | Logical Channel Group |
| MAC | Medium Access Control |
| MIB | Master Information Block |
| NAS | Non-Access Stratum |
| NG-RAN | NG Radio Access Network |
| NR | NR Radio Access |
| PBR | Prioritised Bit Rate |
| PCell | Primary Cell |
| PCI | Physical Cell Identifier |
| PDCCH | Physical Downlink Control Channel |

TABLE 1-continued

| Acronym | Full name |
|---|---|
| PDCP | Packet Data Convergence Protocol |
| PDSCH | Physical Downlink Shared Channel |
| PDU | Protocol Data Unit |
| PHR | Power Headroom Report |
| PLMN | Public Land Mobile Network |
| PRACH | Physical Random Access Channel |
| PRB | Physical Resource Block |
| PSS | Primary Synchronisation Signal |
| PUCCH | Physical Uplink Control Channel |
| PUSCH | Physical Uplink Shared Channel |
| RACH | Random Access Channel |
| RAN | Radio Access Network |
| RA-RNTI | Random Access RNTI |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCell | Secondary Cell |
| SCS | Subcarrier Spacing |
| SDAP | Service Data Adaptation Protocol |
| SDU | Service Data Unit |
| SFN | System Frame Number |
| S-GW | Serving Gateway |
| SI | System Information |
| SIB | System Information Block |
| SpCell | Special Cell |
| SRB | Signalling Radio Bearer |
| SRS | Sounding Reference Signal |
| SSB | SS/PBCH block |
| SSS | Secondary Synchronisation Signal |
| SUL | Supplementary Uplink |
| TM | Transparent Mode |
| UCI | Uplink Control Information |
| UE | User Equipment |
| UM | Unacknowledged Mode |

Table 2 lists the terminologies and their definition used throughout the present disclosure.

TABLE 2

| Terminology | Definition |
|---|---|
| allowedCG-List | List of configured grants for the corresponding logical channel. This restriction applies only when the UL grant is a configured grant. If present, UL MAC SDUs from this logical channel can only be mapped to the indicated configured grant configuration. If the size of the sequence is zero, then UL MAC SDUs from this logical channel cannot be mapped to any configured grant configurations. If the field is not present, UL MAC SDUs from this logical channel can be mapped to any configured grant configurations. |
| allowed SCS-List | List of allowed sub-carrier spacings for the corresponding logical channel. If present, UL MAC SDUs from this logical channel can only be mapped to the indicated numerology. Otherwise, UL MAC SDUs from this logical channel can be mapped to any configured numerology. |
| allowed Serving Cells | List of allowed serving cells for the corresponding logical channel. If present, UL MAC SDUs from this logical channel can only be mapped to the serving cells indicated in this list. Otherwise, UL MAC SDUs from this logical channel can be mapped to any configured serving cell of this cell group. |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Dedicated signalling | Signalling sent on DCCH logical channel between the network and a single UE. |
| discard Timer | Timer to control the discard of a PDCP SDU. Starting when the SDU arrives. Upon expiry, the SDU is discarded. |
| F | The Format field in MAC subheader indicates the size of the Length field. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| MAC-I | Message Authentication Code—Integrity. 16 bit or 32 bit bit string calculated by NR Integrity Algorithm based on the security key and various fresh inputs |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| Logical Channel Config | The IE LogicalChannelConfig is used to configure the logical channel parameters. It includes priority, prioritisedBitRate, allowedServingCells, allowedSCS-List, maxPUSCH-Duration, logicalChannelGroup, allowedCG-List etc |
| logical Channel Group | ID of the logical channel group, as specified in TS 38.321, which the logical channel belongs to |
| MAC CE | Control Element generated by a MAC entity. Multiple types of MAC CEs are defined, each of which is indicated by corresponding LCID. A MAC CE and a corresponding MAC sub-header comprises MAC subPDU |

TABLE 2-continued

| Terminology | Definition |
|---|---|
| Master Cell Group | in MR-DC, a group of serving cells associated with the Master Node, comprising of the SpCell (PCell) and optionally one or more SCells. |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. |
| NR | NR radio access |
| PCell | SpCell of a master cell group. |
| PDCP entity reestablishment | The process triggered upon upper layer request. It includes the initialization of state variables, reset of header compression and manipulating of stored PDCP SDUs and PDCP PDUs. The details can be found in 5.1.2 of 38.323 |
| PDCP suspend | The process triggered upon upper layer request. When triggered, transmitting PDCP entity set TX_NEXT to the initial value and discard all stored PDCP PDUs. The receiving entity stop and reset t-Reordering, deliver all stored PDCP SDUs to the upper layer and set RX_NEXT and RX_DELIV to the initial value |
| PDCP-config | The IE PDCP-Config is used to set the configurable PDCP parameters for signalling and data radio bearers. For a data radio bearer, discardTimer, pdcp-SN-Size, header compression parameters, t-Reordering and whether integrity protection is enabled are configured. For a signaling radio bearer, t-Reordering can be configured |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Primary SCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |
| PUCCH SCell | a Secondary Cell configured with PUCCH. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| RX_DELIV | This state variable indicates the COUNT value of the first PDCP SDU not delivered to the upper layers, but still waited for. |
| RX_NEXT | This state variable indicates the COUNT value of the next PDCP SDU expected to be received. |
| RX_REORD | This state variable indicates the COUNT value following the COUNT value associated with the PDCP Data PDU which triggered t-Reordering. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above.<br>The cell selection criterion S is fulfilled (i.e. RSRP and RSRQ are better than specific values |
| t-Reordering | Timer to control the reordering operation of received PDCP packets. Upon expiry, PDCP packets are processed and delivered to the upper layers. |
| TX_NEXT | This state variable indicates the COUNT value of the next PDCP SDU to be transmitted. |
| UE Inactive AS Context | UE Inactive AS Context is stored when the connection is suspended and restored when the connection is resumed. It includes information below. the current KgNB and KRRCint keys, the ROHC state, the stored QoS flow to DRB mapping rules, the C-RNTI used in the source PCell, the cellIdentity and the physical cell identity of the source PCell, the spCellConfigCommon within ReconfigurationWithSync of the NR PSCell (if configured) and all other parameters configured except for:<br>parameters within Reconfiguration WithSync of the PCell;<br>parameters within ReconfigurationWithSync of the NR PSCell, if configured;<br>parameters within MobilityControlInfoSCG of the E-UTRA PSCell, if configured;<br>servingCellConfigCommonSIB; |

In the present invention, "trigger" or "triggered" and "initiate" or "initiated" may be used in the same meaning.

In the present invention, "radio bearers allowed for the second resume procedure", "radio bearers for which the second resume procedure is set", and "radio bearers for which the second resume procedure is enabled" may all have the same meaning.

FIG. 1A is a diagram illustrating the architecture of an 5G system and a NG-RAN to which the disclosure may be applied.

5G system consists of NG-RAN 1A-01 and 5GC 1A-02. An NG-RAN node is either.

a gNB, providing NR user plane and control plane protocol terminations towards the UE; or an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink (scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
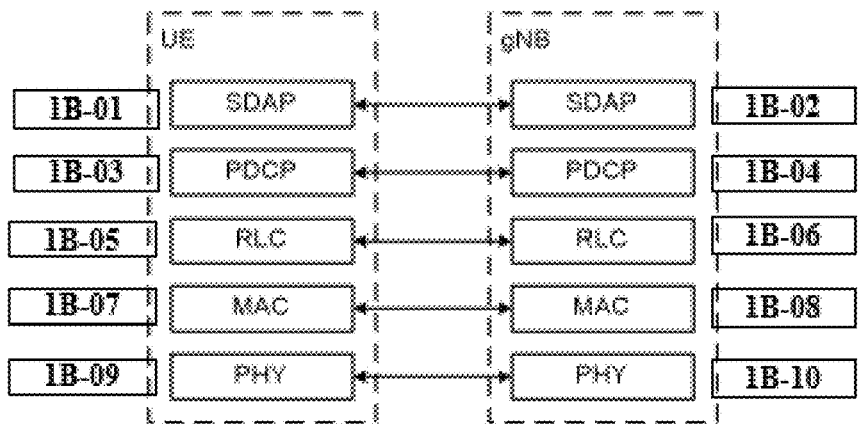
FIG. 1B is a diagram illustrating a wireless protocol architecture in an 5G system.
Figure 1B:
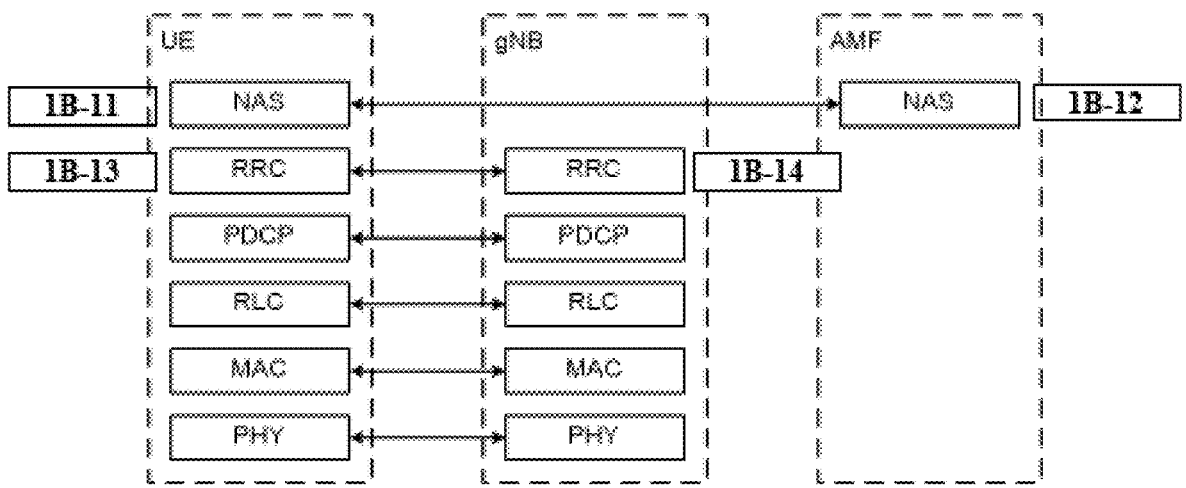

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

TABLE 3

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |

TABLE 3-continued

| Sublayer | Functions |
|---|---|
| MAC | Mapping between logical channels and transport channels, Multiplexing/demultiplexing of MAC SDUs belonging to one or different logical channels into/from transport blocks (TB) deliveredt o/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

The terminal supports three RRC states. Table 4 lists the characteristics of each state.

TABLE 4

| RRC state | Characteristic |
|---|---|
| RRC_IDLE | PLMN selection; Broadcast of system information; Cell re-selection mobility; Paging for mobile terminated data is initiated by 5GC; DRX for CN paging configured by NAS. |
| RRC_INACTIVE | PLMN selection;Broadcast of system information; Cell re-selection mobility; Paging is initiated by NG-RAN (RAN paging); RAN-based notification area (RNA) is managed by NG-RAN; DRX for RAN paging configured by NG-RAN; 5GC-NG-RAN connection (both C/U-planes) is established for UE; The UE AS context is stored in NG-RAN and the UE; NG-RAN knows the RNA which the UE belongs to. |
| RRC_CONNECTED | 5GC-NG-RAN connection (both C/U-planes) is established for UE; The UE AS context is stored in NG-RAN and the UE; NG-RAN knows the cell which the UE belongs to; Transfer of unicast data to/from the UE; Network controlled mobility including measurements. |

Figure 1C:
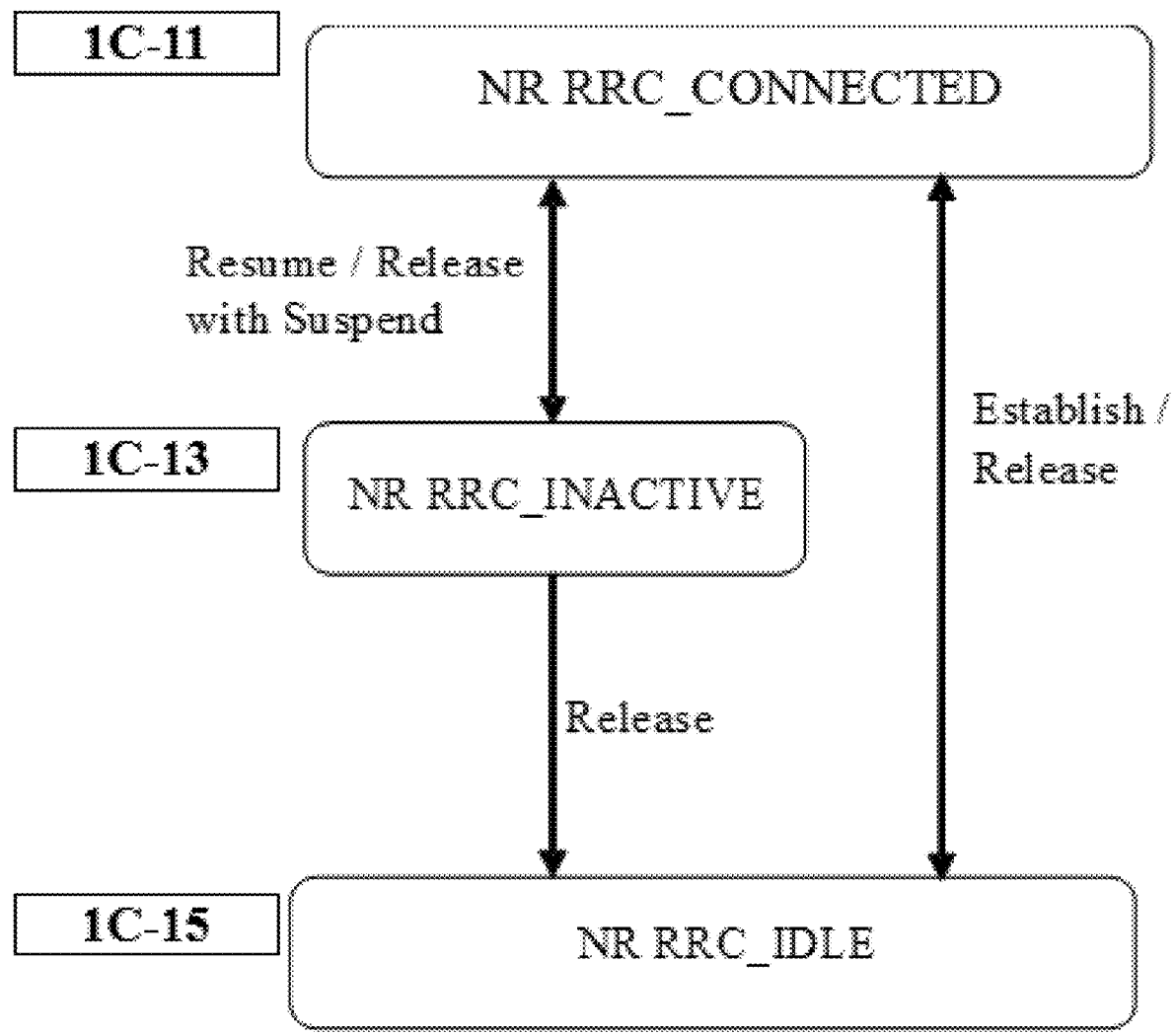
FIG. 1C is a diagram illustrating transitions between RRC states.

FIG. 1C is a diagram illustrating an RRC state transition.

Between RRC_CONNECTED 1C-11 and RRC_INACTIVE 1C-13, a state transition occurs due to the exchange of the Resume message and the Release message containing the Suspend EE.

A state transition occurs between RRC_CONNECTED 1C-11 and RRC_IDLE 1C-15 through RRC connection establishment and RRC connection release.

SuspendConfig includes the following information.

<SuspendConfig>

1: The first terminal identifier: an identifier of a terminal that may be included in the ResumeRequest when a state transition to RRC_CONNECTED is made. It has a 40-bit length.

2: The second terminal identifier: an identifier of a terminal that may be included in the Resume Request when a state transition to RRC_CONNECTED is made. It has a 24-bit length.

3: ran-Paging Cycle: Paging cycle to be applied in RRC_INACTIVE state.

4: ran-Notification AreaInfo: Configuration information of a ran-Notification Area consisting of a list of cells and the like. The terminal initiates a resume procedure when the ran_Notification Area is changed.

5: t380: Timer related to the periodic resumption procedure.

6: NextHopChangingCount (NCC): Counter used to derive new security keys after performing the resume procedure.

Figure 1D:
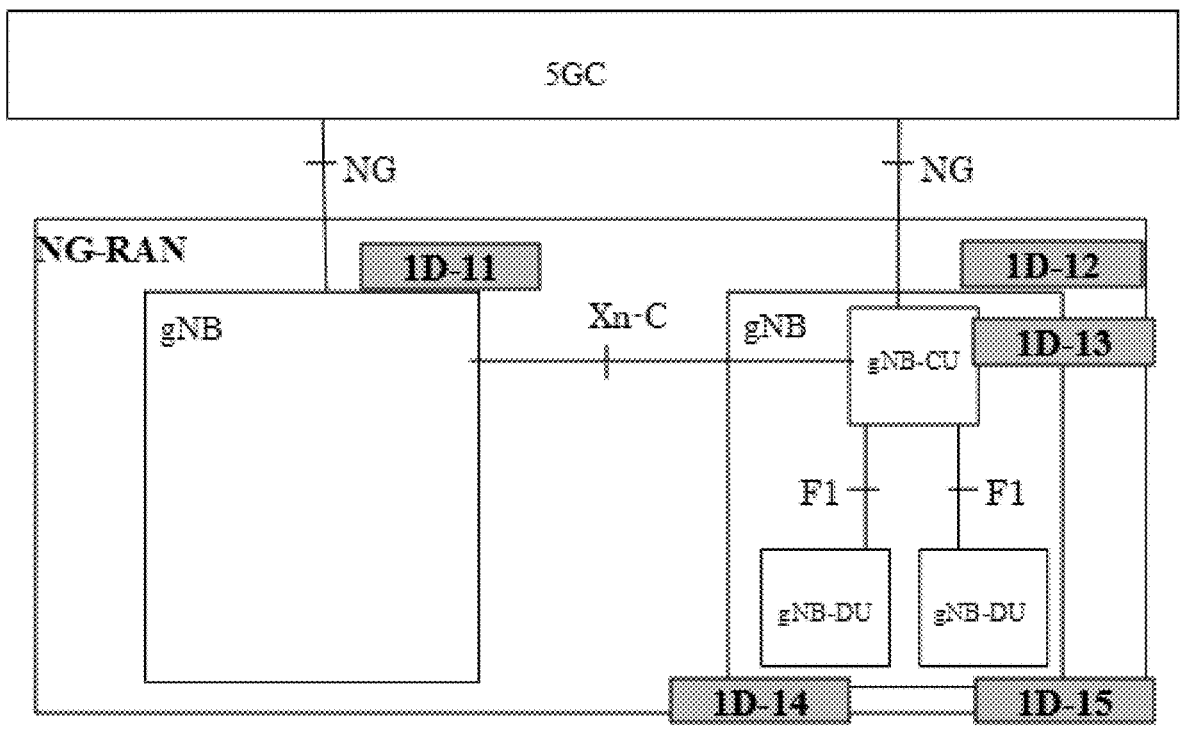
FIG. 1D is a diagram illustrating the architecture of a base station.

FIG. 1D is a diagram illustrating the architecture of an GNB to which the disclosure may be applied.

gNB 1D-11 or 1D-12 consists of a gNB-CU 1D-13 and one or more gNB-DU 1D-14 or 1D-15. gNB-CU and gNB-DU are interconnected via F1 interface. A gNB-DU is connected to only one gNB-CU. gNB-CU provides RRC, SDAP and PDCP protocol sublayers. gNB-DU provides RLC, MAC and PHY protocol sublayers.

The UE monitors the PO for paging reception. In the current specification, different paging cycles may result in different POs in the IDLE and INACTIVE states. By ensuring consistent POs in the IDLE and INACTIVE states, paging can be more efficient for both the UE and the network.

Figure 2A:
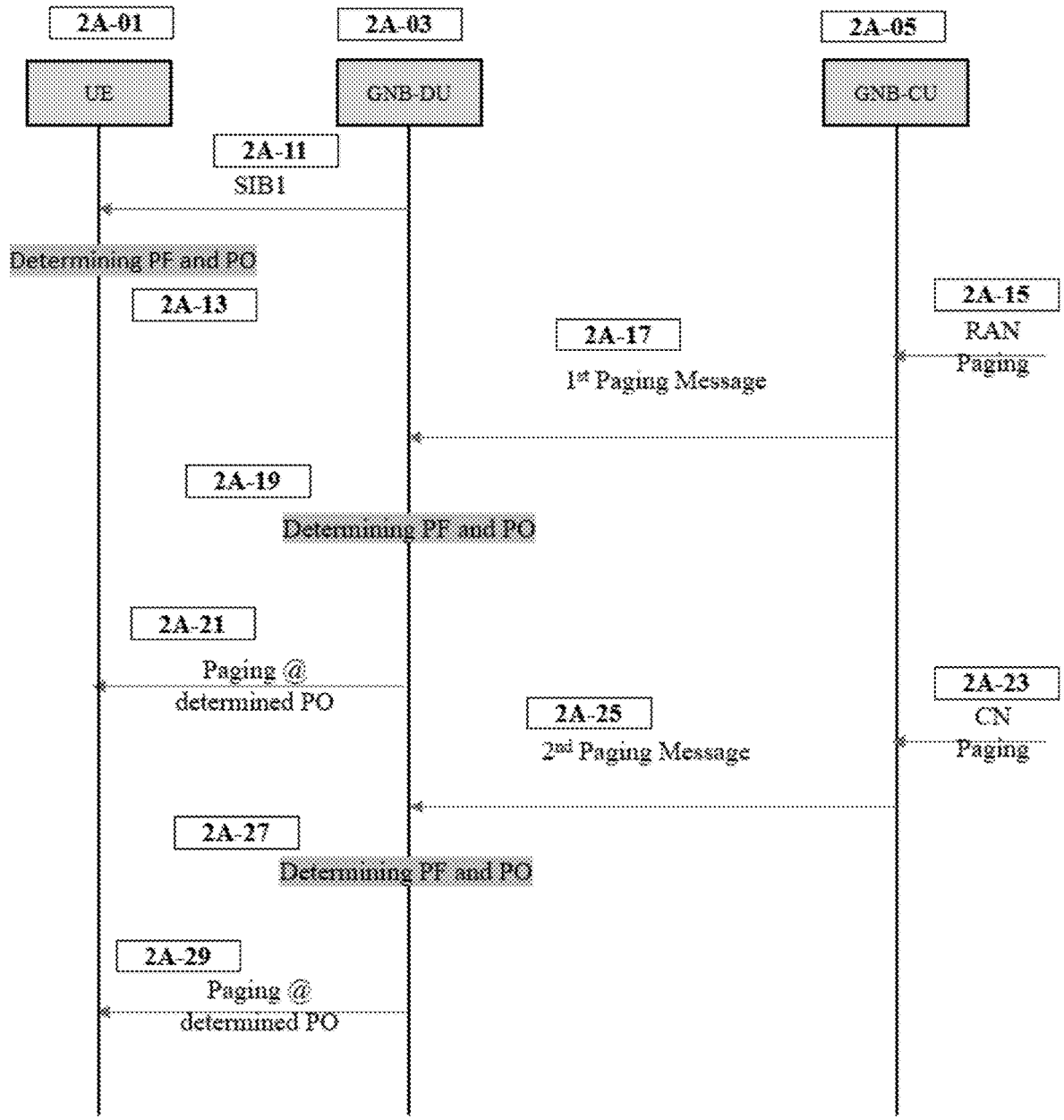
FIG. 2A is a diagram illustrating operations of a terminal and a distribution unit and a central unit according to an embodiment of the present invention.

FIG. 2A illustrates the operations of UE and DU and CU for paging.

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g., subframe or OFDM symbol) where paging DCI can be sent. One Paging Frame (PF) is one Radio Frame and may contain one or multiple PO(s) or starting point of a PO.

The PF and PO for paging are determined by the following formulae:

SFN for the PF is determined by:

$$(SFN+PF\_offset) \bmod T = (T \text{ div } N)*(UE\_ID \bmod N\_PF)$$

Index (i_s), indicating the index of the PO is determined by:

$$i\_s = \text{floor}(UE\_ID/N\_PF) \bmod Ns$$

The following parameters are used for the calculation of PF and i_s above:

T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied).

N_PF: number of total paging frames in T and broadcasted in SIB1.

Ns: number of paging occasions for a PF and broadcasted in SIB1.

PF_offset: offset used for PF determination and broadcasted in SIB1.

UE_ID: 5G-S-TMSI mod 1024 a UE specific DRX value for IDLE UE is allocated by AMF and configured by upper layers. a UE specific DRX value for INACTIVE UE is allocated by GNB and configured by RRC.

If UE specific DRX value configured by upper layers and UE specific DRX value configured by RRC are different, different i_s can be applied to each state. It bears two problems.

Firstly, UE must determine i_s again upon transition from RRC INACTIVE state to RRC IDLE state. Secondly, INACTIVE UE cannot monitor paging transmitted from AMF because the paging is transmitted in the PO calculated from the UE specific DRX cycle configured by AMF while UE monitors PO calculated from the UE specific DRX cycle configured by GNB.

To overcome the problem, CU calculates i_s based on IDLE mode DRX cycle and instructs DU to use the calculated i_s. UE calculates i_s based on IDLE mode DRX cycle even when it is in RRC_INACTIVE state.

5G-S-TMSI is a 5G S-Temporary Mobile Subscription Identifier, a temporary UE identity provided by the 5GC which uniquely identifies the UE within the tracking area. 5G-S-TMSI is allocated by AMF during tracking area update procedure or during registration procedure.

To ensure backward compatibility with the old release devices, SuspendConfig mandatorily includes ran-Paging-Cycle and optionally includes extended-ran-Paging-Cycle.

If SuspendConfig includes only ran-Paging-Cycle, UE specific DRX value configured by RRC is determined by ran-Paging-Cycle. If SuspendConfig includes both ran-Paging-Cycle and extended-ran-paging-cycle, UE specific DRX value configured by RRC is determined by extend-ran-Paging-Cycle.

In the following, i_s is called PO-Index as well.

In 2A-11, DU 2A-03 transmits SIB1 on the Uu interface. SIB1 includes following information; a default DRX value, a joint-parameter-N_PF/PF_offset, a Ns and ranPagingIdlePO.

The default DRX value is used to derive the paging frames together with the joint parameter and other parameters. The default DRX value is one of predefined values; 32, 64, 128 and 256. The values indicate 32 radio frames, 64 radio frames, 128 radio frames and 256 radio frames respectively.

The joint-parameter-N_PF/PF_offset is used to derive N_PF and PF_offset.

The joint-parameter-N_PF/PF_offset can indicate one of five predefined values: oneT, halfT, quarterT, oneEighthT, oneSixteenthT.

The Ns indicates one of three predefined values: four, two, one.

ranPagingIdlePO indicates that the network supports to send RAN paging in PO that corresponds to the i_s as determined by UE in RRC_IDLE state.

UE 2A-01 camping on the cell controlled by the DU receives the SIB1. The UE determines PF based on at least in part of the above parameters.

In 2A-13, UE determines PF and PO.

UE determines the PF based on UE_ID, N_PF1, PF_offset and T_PF.

If UE specific DRX value is configured by upper layers, UE in RRC_IDLE determines T_PF by the shortest of the default DRX value and the UE specific DRX value configured by upper layers.

If UE specific DRX value is not configured by upper layers, UE determines T_PF the default DRX value.

If UE specific DRX value configured by RRC is greater than 256, UE in RRC_INACTIVE determines T_PF the UE specific DRX value configured by RRC.

If UE specific DRX value configured by RRC is smaller than 256, UE in RRC_INACTIVE determines T_PF the shortest of the default DRX value and the UE specific DRX value configured by RRC.

UE determines N_PF1 based on the determined T_PF and a value indicated by the joint parameter. N_PF is calculated by dividing T_PF by 1 in case that the joint parameter indicates the 1st value, dividing T_PF by 2 in case that the parameter for N indicates the 2nd value, dividing T_PF by 4 in case that the parameter for N indicates the 3rd value, dividing T_PF 8 in case that the parameter for N indicates the 4th value and dividing T_PF 16 in case that the parameter for N indicates the 5th value.

UE determines the index of the PO based on UE_ID, N_PF2 and Ns. N_PF2 is determined by the joint parameter and T_PO. For UE in RRC_IDLE, T_PO and T_PF are same. For UE in RRC_INACTIVE, if the UE does not support to use the same i_s to determine PO in RRC_INACTIVE state as in RRC_IDLE state or if ran-PagingIndlePO is not broadcasted, T_PO and T_PF are same. For UE in RRC_INACTIVE, if the UE supports to use the same i_s to determine PO in RRC_INACTIVE state as in RRC_IDLE state and if ran-PagingIndlePO is broadcasted, T_PF is determined based on UE specific DRX value configured by RRC and T_PO is determined based on UE specific DRX value configured by upper layers.

In other words, In RRC_INACTIVE state, UE shall use the same PO-Index as for RRC_IDLE state if the UE supports to use the same i_s to determine PO in RRC_INACTIVE state as in RRC_IDLE state and if ran-PagingIndlePO is broadcasted.

In 2A-15, CU 2A-05 receives RAN paging message from another CU over Xn interface. The purpose of the RAN Paging procedure is to enable a NG-RAN node to request paging of a UE in another NG-RAN node. RAN paging message includes following information; UE-Identity-Index-Value, UE-RAN-Paging-Identity, Paging-DRX and RAN-Paging-Area.

The RAN paging message can optionally include PO-info. The RAN paging message can optionally include extended-Paging-DRX.

UE-Identity-Index-Value is bit string of 10 bit. This IE is used by the target NG-RAN node to calculate the paging-frame. This IE corresponds to UE_ID.

UE-RAN-Paging-Identity is the-first-terminal-identifier of the UE to be paged.

Paging-DRX is UE-specific-DRX-value configured by RRC. This IE corresponds to ran-Paging-Cycle of the UE to be paged.

extended-Paging-DRX is UE-specific-DRX value configured by RRC. This IE corresponds to extended-ran-Paging-Cycle of the UE to be paged.

RAN-Paging-Area defines the paging area for RAN paging a UE in RRC_INACTIVE state. This IE corresponds to ran-Notification-AreaInfo of the UE to be paged.

CU generates a first paging message based on at least part of the RAN paging message. CU determines DUs to which the first paging message to be transmitted.

In 2A-17, CU sends the first paging message to the determined DUs. The first paging message includes following information; UE-Identity-Index-Value and RAN-UE-Paging-Identity. The first paging message can optionally include PO-info. The first paging message includes either Paging-DRX or extended-Paging-DRX.

UE-Identity-Index-Value, RAN-UE-Paging-Identity, Paging-DRX, extended-Paging-DRX and PO-info included in the first paging message are respectively UE-Identity-Index-Value, UE-RAN-Paging-Identity, Paging-DRX, extended-Paging-DRX and PO-info received in RAN paging message.

CU includes Paging-DRX in the first paging message if the RAN paging message includes Paging-DRX but not include extended-Paging-DRX.

CU includes extended-Paging-DRX in the first paging message if the RAN paging message includes both Paging-DRX and extended-Paging-DRX.

The first paging message can be triggered by the CU 2A-05 itself. CU generates the first paging message for a UE in RRC_INACTIVE when DL data for the UE arrives.

CU determines UE-Identity-Index-Value by the 10 LSB bits of 5G-S-TMSI of the UE (i.e., UE-Identity-Index-Value=5G-S-TMSI mod 1024).

CU determines RAN-UE-Paging-Identity by the first terminal identity allocated to the UE.

CU determines Paging-DRX by ran-Paging-Cycle configured to the UE if the UE is configured only with ran-Paging-Cycle. CU determines extended-Paging-DRX by extended-ran-Paging-Cycle configured to the UE if the UE is configured with both ran-Paging-Cycle and extended-ran-Paging-Cycle.

If the UE has indicated in a UL RRC message for reporting UE capability that the UE supports to use the same i_s to determine PO in RRC_INACTIVE state as in RRC_IDLE state and if the DU broadcasts ran-Paging-IndlePO, CU includes PO-info in the first paging message.

PO-info can include UE specific DRX cycle configured by upper layers. CU stores UE specific DRX cycle configured by upper layers which is informed by a AMF during the RRC connection of the corresponding UE.

PO-info can include N_PF determined based on UE specific DRX cycle configured by upper layers.

PO-info can include PO-index determined based on UE specific DRX cycle configured by upper layers.

In 2A-19, DU determines PF and PO based on the information included in the first paging message.

DU determines PF based on UE-Identity-Index-Value, N_PF1, PF_offset and T_PF.

If Paging-DRX is included in the first paging message, T_PF is shortest of the default DRX value and Paging-DRX.

If extended-Paging-DRX is included in the first paging message, T_PF is extended-Paging-DRX.

N_PF1 is determined based on T_PF and the joint parameter.

DU determines PO-Index based on UE-Identity-Index-Value, N_PF2 and T_PO.

If PO-Info is not included in the first paging message, N_PF2 and T_PO are same as N_PF1 and T_PF respectively.

If PO-Info is included in the first paging message, N_PF2 and T_PO are determined as below.

If PO-Info includes UE specific DRX cycle configured by upper layers, T_PO is determined based on UE specific DRX cycle configured by upper layers indicated in PO-Info. N_PF2 is determined based on the determined T_PO.

If PO-Info includes N_PF determined based on UE specific DRX cycle configured by upper layers, N_PF2 is determined by N_PF indicated in PO-Info.

If PO-Info includes PO-Index determined based on UE specific DRX cycle configured by upper layers, PO-Index is determined by PO-Index indicated in PO-Info.

In 2A-21, DU transmits RRC paging message at the determined PO of the determined PF. RRC paging message includes PagingUE-Identity. This IE is the first terminal identifier.

Upon receiving the RRC paging message, UE initiates RRC connection resumption procedure. In RRC connection resumption procedure, UE transmits a first UL RRC message containing the UE's stored second terminal identity. DU forward the UL RRC message to CU. CU searches UE context based on the received UE identity and decides whether to accept the request or not.

In 2A-23, CU 2A-05 receives CN paging message from a AMF over NG interface. The purpose of the CN Paging procedure is to enable a AMF to request paging of a UE in another NG-RAN node. CN paging message includes following information; UE-Paging-Identity and Paging-DRX.

UE-Paging-Identity is 5G-S-TMSI of the UE to be paged.

Paging-DRX is UE-specific-DRX-value configured by upper layers.

CU generates a second paging message based on at least part of the CN paging message. CU determines DUs to which the second paging message to be transmitted.

In 2A-25, CU sends the second paging message to the determined DUs. The second paging message includes following information; UE-Identity-Index-Value, CN-UE-Paging-Identity and Paging-DRX. The second paging message does not include PO-info.

CN-UE-Paging-Identity and Paging-DRX included in the second paging message are respectively UE-Paging-Identity and Paging-DRX received in CN paging message. UE-Identity-Index-Value is determined by CU based on UE-Paging-Identity received in CN paging message.

In 2A-27, DU determines PF and PO based on the information included in the second paging message.

DU determines PF based on UE-Identity-Index-Value, N_PF1, PF_offset and T_PF.

If Paging-DRX is included in the second paging message, T_PF is shortest of the default DRX value and Paging-DRX.

If Paging-DRX is included in the second paging message, T_PF is the default DRX value.

N_PF1 is determined based on T_PF and the joint parameter.

DU determines PO-Index based on UE-Identity-Index-Value, N_PF1 and T_PF.

In 2A-29, DU transmits RRC paging message at the determined PO. RRC paging message includes PagingUE-Identity. PagingUE-Identity is 5G-S-TMSI.

Upon receiving the RRC paging message, UE initiates RRC connection establishment procedure. In RRC connection establishment procedure, UE transmits a second UL RRC message containing part of the UE identity allocated by upper layers (I.E., 5G-S-TMSI) and a third UL RRC message containing the remaining part of the UE identity allocated by upper layers. DU forward the third UL RRC message to CU along with the CU performs call admission control and decides whether to accept the request or not.

Figure 2B:
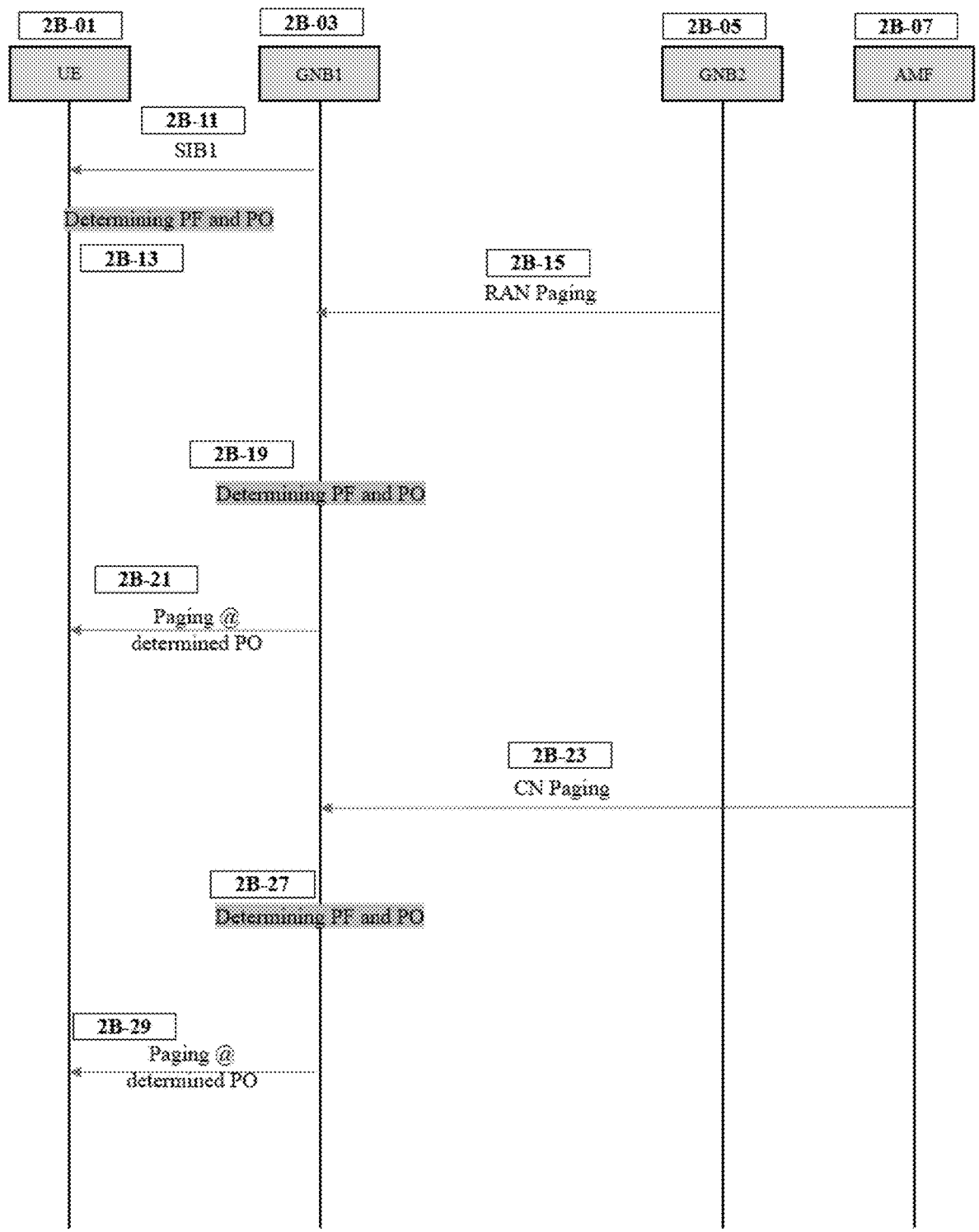
FIG. 2B is a diagram illustrating operations of a terminal and a base station according to an embodiment of the present invention.

FIG. 2B illustrates the operations of UE and GNB for paging.

In 2B-11, GNB1 2B-03 transmits SIB1 on the Uu interface. SIB1 includes following information; a default DRX value, a joint-parameter-N_PF/PF_offset, a Ns and ranPagingIdlePO.

The default DRX value is used to derive the paging frames together with the joint parameter and other parameters. The default DRX value is one of predefined values; 32, 64, 128 and 256. The values indicate 32 radio frames, 64 radio frames, 128 radio frames and 256 radio frames respectively.

The joint-parameter-N_PF/PF_offset is used to derive N_PF and PF_offset.

The joint-parameter-N_PF/PF_offset can indicate one of five predefined values: oneT, halfT, quarterT, oneEighthT, oneSixteenthT.

The Ns indicates one of three predefined values: four, two, one.

ranPagingIdlePO indicates that the network supports to send RAN paging in PO that corresponds to the i_s as determined by UE in RRC_IDLE state.

UE 2B-01 camping on the cell controlled by the GNB1 receives the SIB1. The UE determines PF based on the above parameters.

In 2B-13, UE determines PF and PO.

UE determines the PF based on UE_ID, N_PF1, PF_offset and T_PF.

If UE specific DRX value is configured by upper layers, UE in RRC_IDLE determines T_PF by the shortest of the default DRX value and the UE specific DRX value configured by upper layers.

If UE specific DRX value is not configured by upper layers, UE determines T_PF by the default DRX value.

If UE specific DRX value configured by RRC is greater than 256, UE in RRC_INACTIVE determines T_PF by the UE specific DRX value configured by RRC.

If UE specific DRX value configured by RRC is smaller than 256, UE in RRC_INACTIVE determines T_PF by the shortest of the default DRX value and the UE specific DRX value configured by RRC.

UE determines N_PF1 based on the determined T_PF and a value indicated by the joint parameter. N_PF is calculated by dividing T_PF by 1 in case that the joint parameter indicates the 1st value, dividing T_PF by 2 in case that the parameter for N indicates the 2nd value, dividing T_PF by 4 in case that the parameter for N indicates the 3rd value, dividing T_PF 8 in case that the parameter for N indicates the 4th value and dividing T_PF 16 in case that the parameter for N indicates the 5th value.

UE determines the index of the PO based on UE_ID, N_PF2 and Ns. N_PF2 is determined by the joint parameter and T_PO. For UE in RRC_IDLE, T_PO and T_PF are same. For UE in RRC_INACTIVE, if the UE does not support to use the same i_s to determine PO in RRC_INACTIVE state as in RRC_IDLE state or if ran-PagingIndlePO is not broadcasted, T_PO and T_PF are same. For UE in RRC_INACTIVE, if the UE supports to use the same i_s to determine PO in RRC_INACTIVE state as in RRC_IDLE state and if ran-PagingIndlePO is broadcasted, T_PF is determined based on UE specific DRX value configured by RRC and T_PO is determined based on UE specific DRX value configured by upper layers.

In other words, In RRC_INACTIVE state, UE shall use the same PO-Index as for RRC_IDLE state if the UE supports to use the same i_s to determine PO in RRC_INACTIVE state as in RRC_IDLE state and if ran-PagingIndlePO is broadcasted.

In 2B-15, GNB1 2B-03 receives RAN paging message from GNB2 (2B-05) over Xn interface. The purpose of the RAN Paging procedure is to enable a NG-RAN node to request paging of a UE in another NG-RAN node. RAN paging message includes following information; UE-Identity-Index-Value, UE-RAN-Paging-Identity, Paging-DRX and RAN-Paging-Area.

The RAN paging message can optionally include PO-info. The RAN paging message can optionally include extended-Paging-DRX.

UE-Identity-Index-Value is a bit string of 10 bit. This IE is used by the target NG-RAN node to calculate the paging-frame. This IE corresponds to UE_ID.

UE-RAN-Paging-Identity is the-first-terminal-identifier of the UE to be paged.

Paging-DRX is UE-specific-DRX-value configured by RRC. This IE corresponds to ran-Paging-Cycle of the UE to be paged.

extended-Paging-DRX is UE-specific-DRX value configured by RRC. This IE corresponds to extended-ran-Paging-Cycle of the UE to be paged.

RAN-Paging-Area defines the paging area for RAN paging a UE in RRC_INACTIVE state. This IE corresponds to ran-Notification-AreaInfo of the UE to be paged.

GNB2 2B-05 generates the RAN paging message for a UE in RRC_INACTIVE when DL data for the UE arrives.

GNB2 determines UE-Identity-Index-Value by the 10 LSB bits of 5G-S-TMSI of the UE (i.e., UE-Identity-Index-Value=5G-S-TMSI mod 1024).

GNB2 determines RAN-UE-Paging-Identity by the first terminal identity allocated to the UE.

GNB2 determines Paging-DRX by ran-Paging-Cycle configured to the UE if the UE is configured only with ran-Paging-Cycle. GNB2 determines extended-Paging-DRX by extended-ran-Paging-Cycle configured to the UE if the UE is configured with both ran-Paging-Cycle and extended-ran-Paging-Cycle.

If the UE has indicated in a UL RRC message for reporting UE capability that the UE supports to use the same i_s to determine PO in RRC_INACTIVE state as in RRC_IDLE state and if the GNB1 broadcasts ran-Paging-IndlePO, GNB2 includes PO-info in RAN paging message.

PO-info can include UE specific DRX cycle configured by upper layers. GNB2 stores UE specific DRX cycle configured by upper layers which is informed by a AMF during the RRC connection of the corresponding UE.

PO-info can include N_PF determined based on UE specific DRX cycle configured by upper layers.

PO-info can include PO-index determined based on UE specific DRX cycle configured by upper layers.

In 2B-19, GNB1 determines PF and PO based on the information included in RAN paging message.

GNB1 determines PF based on UE-Identity-Index-Value, N_PF1, PF_offset and T_PF.

If Paging-DRX is included in RAN paging message, T_PF is shortest of the default DRX value and Paging-DRX.

If extended-Paging-DRX is included in RAN paging message, T_PF is extended-Paging-DRX.

N_PF1 is determined based on T_PF and the joint parameter.

GNB1 determines PO-Index based on UE-Identity-Index-Value, N_PF2 and T_PO.

If PO-Info is not included in RAN paging message, N_PF2 and T_PO are same as N_PF1 and T_PF respectively.

If PO-Info is included in RAN paging message, N_PF2 and T_PO are determined as below.

If PO-Info includes UE specific DRX cycle configured by upper layers, T_PO is determined based on UE specific DRX cycle configured by upper layers indicated in PO-Info. N_PF2 is determined based on the determined T_PO.

If PO-Info includes N_PF determined based on UE specific DRX cycle configured by upper layers, N_PF2 is determined by N_PF indicated in PO-Info.

If PO-Info includes PO-Index determined based on UE specific DRX cycle configured by upper layers, PO-Index is determined by PO-Index indicated in PO-Info.

In 2B-21, GNB1 transmits RRC paging message at the determined PO of the determined PF. RRC paging message includes PagingUE-Identity. This IE is the first terminal identifier.

Upon receiving the RRC paging message, UE initiates RRC connection resumption procedure. In RRC connection resumption procedure, UE transmits a first UL RRC message containing the UE's stored second terminal identity. GNB1 forward the UL RRC message to GNB2. GNB2 searches UE context based on the received UE identity and decides whether to accept the request or not.

In 2B-23, GNB1 2B-03 receives CN paging message from a AMF 2B-07 over NG interface. The purpose of the CN Paging procedure is to enable a AMF to request paging of a UE in another NG-RAN node. CN paging message includes following information; UE-Paging-Identity and Paging-DRX.

UE-Paging-Identity is 5G-S-TMSI of the UE to be paged.

Paging-DRX is UE-specific-DRX-value configured by upper layers.

In 2B-27, GNB1 determines PF and PO based on the information included in the second paging message.

GNB1 determines PF based on UE-Identity-Index-Value, N_PF1, PF_offset and T_PF.

If Paging-DRX is included in the second paging message, T_PF is shortest of the default DRX value and Paging-DRX.

If Paging-DRX is not included in the second paging message, T_PF is the default DRX value.

N_PF1 is determined based on T_PF and the joint parameter.

GNB1 determines PO-Index based on UE-Identity-Index-Value, N_PF1 and T_PF.

In 2B-29, GNB1 transmits RRC paging message at the determined PO. RRC paging message includes PagingUE-Identity. PagingUE-Identity is 5G-S-TMSI.

Upon receiving the RRC paging message, UE initiates RRC connection establishment procedure. In RRC connection establishment procedure, UE transmits a second UL RRC message containing part of the UE identity allocated by upper layers (i.e., 5G-S-TMSI) and a third UL RRC message containing the remaining part of the UE identity allocated by upper layers. GNB1 forward the third UL RRC message to GNB1 along with the 5G-S-TMSI. GNB1 performs call admission control and decides whether to accept the request or not.

Figure 3A:
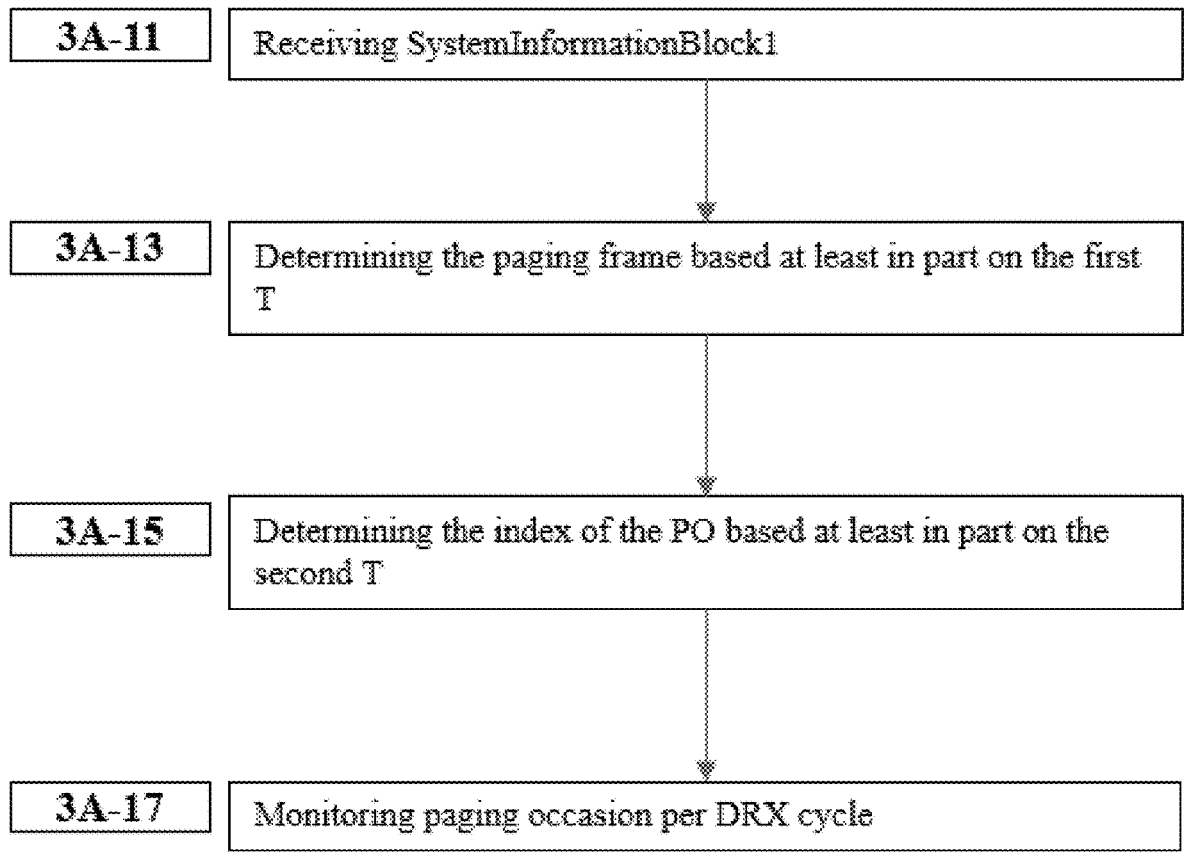
FIG. 3A is a flow diagram illustrating operation of a distributed unit.

FIG. 3A illustrates the operation of the terminal.

In step 3A-11, the terminal receives SystemInformationBlock1.

In step 3A-13, the terminal determines the paging frame based at least in part on the first T.

In step 3A-15, if the UE supports Inactive-state-PO-determination and the network broadcasts RAN-Paging-Idle-PO set to true, the UE determines the index of the PO based at least in part on the second T.

In step 3A-17, the terminal monitors paging occasion per DRX cycle.

The paging occasion is determined by the PO index and the paging frame.

The first T is determined at least in part based on the UE specific DRX value configured by RRC, and the second T is determined at least in part based on the UE specific DRX value configured by upper layer.

If the network does not broadcast RAN-Paging-Idle-PO set to true, the index of the PO is determined based at least in part on the first T.

The first T is used to determine the paging frame in the inactive state, and the second T is used to determine the paging frame in the idle state.

The first T is determined by the shortest of the default DRX value and the UE specific DRX value configured by RRC, and the 2nd T is determined by the shortest of the default DRX value and the UE specific DRX value configured by upper layer.

The SystemInformationBlock1 includes parameters for Default-DRX-Value, Number-of-Paging-Occasion, and Number-of-Paging-Frames.

The parameter for Number-of-Paging-Frames indicates a first value, a second value, a third value, a fourth value, or a fifth value.

The index of the PO is determined at least in part by the first set, The first set consists of the UE-Identifier-Index, the Number-of-Paging-Occasion, the default DRX value, and the Number-of-Paging-Frames.

The UE-Identifier-Index is derived from the second paging identifier, and the second paging identifier is a temporary identifier assigned by AMF.

The UE's support of Inactive-state-PO-determination means that the UE supports using the same PO index to determine the PO in the RRC_INACTIVE state as in the RRC_IDLE state.

Figure 4A:
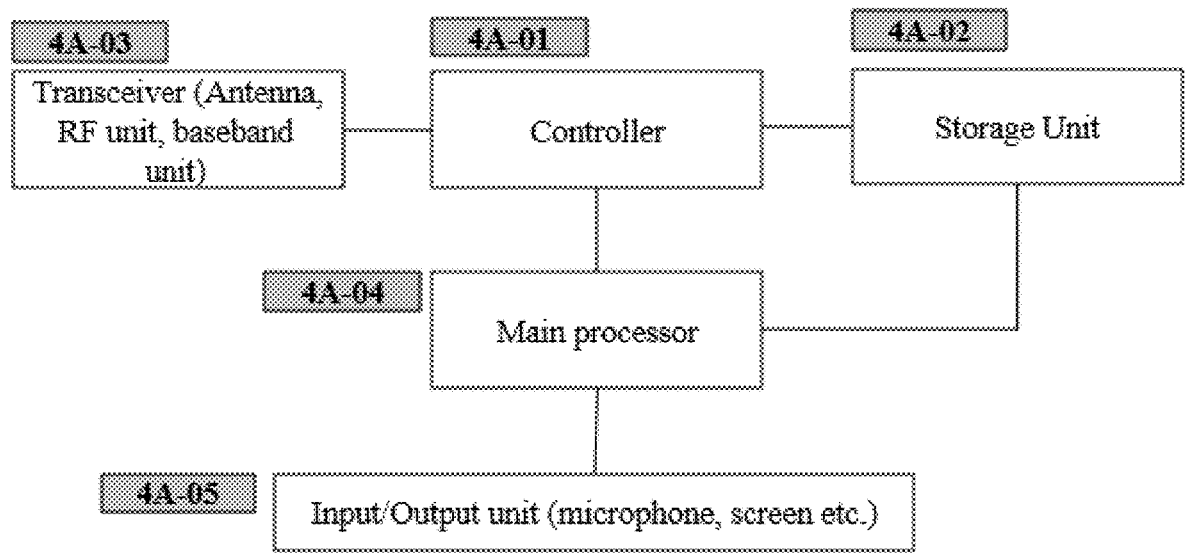
FIG. 4A is a block diagram illustrating the internal structure of a terminal.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2A and FIG. 2B are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
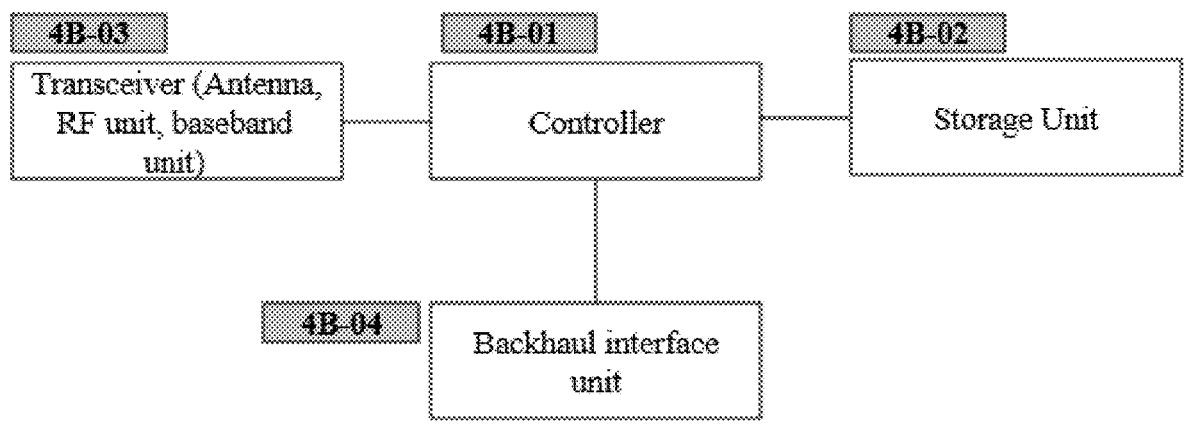
FIG. 4B is a block diagram illustrating the internal structure of a distributed unit.

FIG. 4B is a block diagram illustrating the structure of a DU according to the disclosure.

As illustrated in the diagram, the DU includes a controller 4B-01, a storage unit 4B-02, a transceiver 4B-03 and a backhaul interface unit 4B-04.

The controller 4B-01 controls the overall operations of the DU. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that DU operation illustrated in FIG. 2A are performed.

The storage unit 4B-02 stores data for operation of the main DU, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to determine whether to provide the UE with multi-connection or to discontinue the same. In addition, the storage unit 4B-02 provides stored data at a request of the controller 4B-01.

The transceiver 4B-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the DU to another node, for example, another CU, into a physical signal, and converts a physical signal received from the other node into a bit string.

What is claimed is:

1. A method by a terminal in a wireless communication system, the method comprising:
    receiving system information block 1 (SIB1) that comprises a first parameter related to a number of paging frames;
    determining a paging frame and a paging occasion; and
    receiving a paging message based on the paging occasion of the paging frame,
    wherein a paging occasion index of the paging occasion for RRC_INACTIVE state is determined based on an extended Discontinuous Reception (DRX) cycle configured by upper layer and the first parameter in case that:
        the terminal supports using same paging occasion index in RRC_INACTIVE as in RRC_IDLE; and a second parameter related to idle paging occasion is broadcast in the SIB1, and wherein the paging occasion index of the paging occasion for RRC_INACTIVE state is determined based on the extended DRX cycle configured by Radio Resource Control (RRC) layer and the first parameter in case that:

the terminal supports using same paging occasion index in RRC_INACTIVE as in RRC_IDLE; and the second parameter related to idle paging occasion is not broadcast in the SIB1.

2. The method of claim 1, wherein the paging message comprises a first terminal identifier.

3. The method of claim 2, wherein an uplink message comprising a second terminal identifier is transmitted by the terminal in response to the paging message.

4. The method of claim 3, wherein the second terminal identifier is comprised in the RRC message that causes state transition from RRC_CONNECTED to RRC_INACTIVE.

5. The method of claim 2, wherein the first terminal identifier is comprised in a RRC message that causes state transition from RRC_CONNECTED to RRC_INACTIVE.

6. The method of claim 1, wherein the paging frame is determined further based on a third parameter.

7. The method of claim 6, wherein the third parameter is the last n bits of a third terminal identifier.

8. The method of claim 7, wherein the third terminal identifier is a temporal terminal identifier determined by a core network entity.

9. The method of claim 1, wherein the paging frame contains starting points of one or more paging occasions.

10. The method of claim 1, wherein the paging occasion is a set of one or more physical downlink control channel (PDCCH) monitoring occasions.

11. The method of claim 1, wherein the paging frame is determined further based on an offset.

12. The method of claim 11, wherein the offset and the number of paging frames are determined based on the first parameter.

13. A terminal in a wireless communication system, the terminal comprising:

a transceiver configured to transmit and receive a signal, and a controller configured to control the transceiver to:

receive system information block 1 (SIB1) that comprises a first parameter related to a number of paging frames;

determine a paging frame and a paging occasion; and receive a paging message based on the paging occasion of the paging frame, wherein a paging occasion index of the paging occasion for RRC_INACTIVE state is determined based on an extended Discontinuous Reception (DRX) cycle configured by upper layer and the first parameter in case that:

the terminal supports using same paging occasion index in RRC_INACTIVE as in RRC_IDLE; and a second parameter related to idle paging occasion is broadcast in the SIB1, and wherein the paging occasion index of the paging occasion for RRC_INACTIVE state is determined based on the extended DRX cycle configured by Radio Resource Control (RRC) layer and the first parameter in case that:

the terminal supports using same paging occasion index in RRC_INACTIVE as in RRC_IDLE; and the second parameter related to idle paging occasion is not broadcast in the SIB1.

* * * * *